C. E. HOUGH.
MILK BOTTLE CARRIER.
APPLICATION FILED DEC. 29, 1920.
1,422,574.
Patented July 11, 1922.
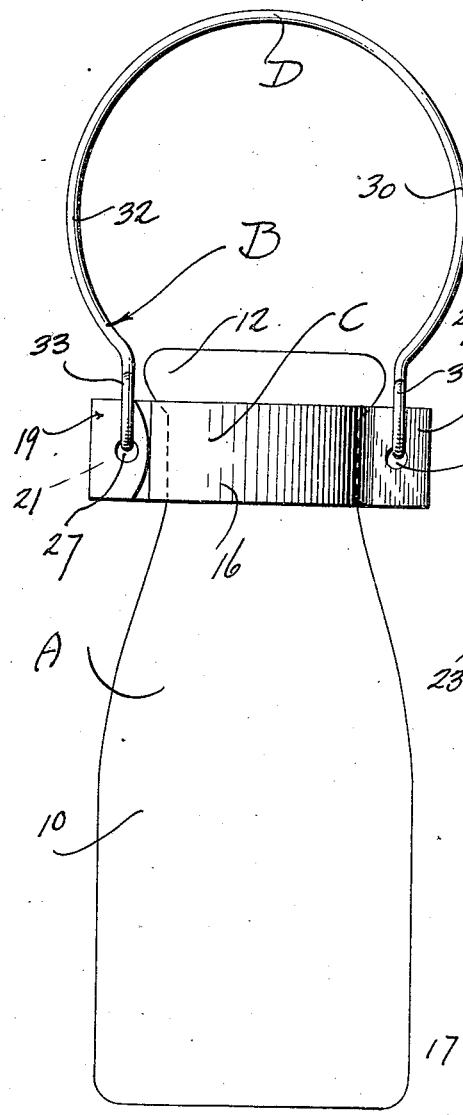
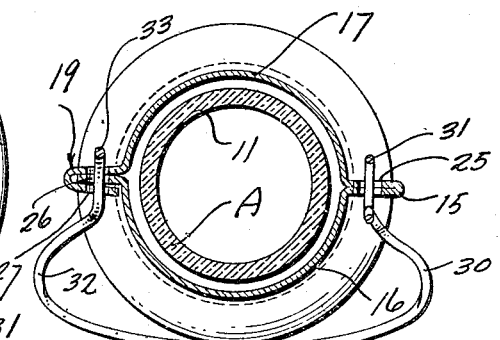
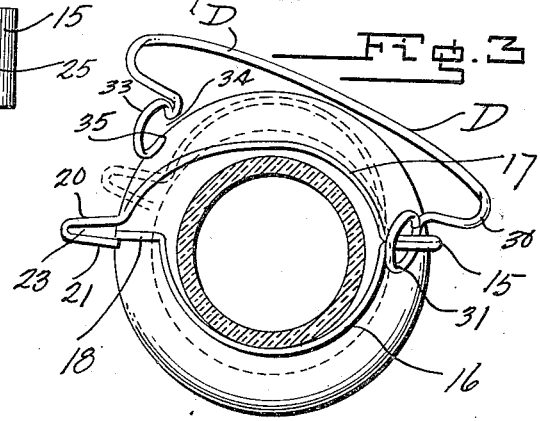
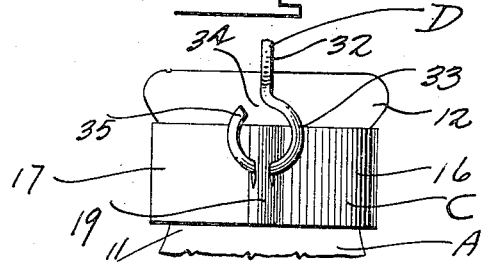
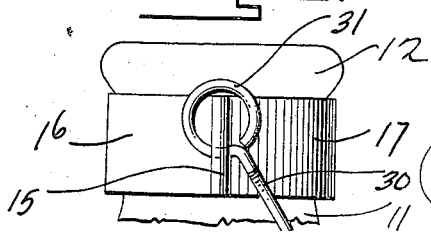
Clarence E. Hough
Inventor
By Lancaster and Allwine
Attorney

UNITED STATES PATENT OFFICE.

CLARENCE E. HOUGH, OF BOWEN, ILLINOIS.

MILK-BOTTLE CARRIER.

1,422,574. Specification of Letters Patent. Patented July 11, 1922.

Application filed December 29, 1920. Serial No. 433,873.

*To all whom it may concern:*

Be it known that I, CLARENCE E. HOUGH, a citizen of the United States, residing at Bowen, in the county of Hancock and State of Illinois, have invented certain new and useful Improvements in Milk-Bottle Carriers, of which the following is a specification.

This invention relates to a detachable handle structure to facilitate the carrying of milk bottles and the like.

The primary object of the invention is to provide a detachable carrier structure, which can readily and positively be attached to a milk bottle or the like, in a minimum of time, for carrying the same, without liability of breakage to the article carried.

A further object of the invention is the provision of a carrier structure of the above described character, which does not necessitate the complete removal of any of its parts to attach or detach the same to or from an article.

A further object of the invention is the provision of an article carrier of the above described character, which is extremely simple in construction, effective in operation, economical to manufacture, and one which could be used as an advertising accessory.

Other objects and advantages of the improved carrier for milk bottles will be apparent during the course of the following detailed description.

In the accompanying drawings, forming a part of this specification, and in which like reference characters designate like parts throughout the same:

Figure 1 is a side elevation of the article carrier showing the same securely attached to a milk bottle for the purpose of carrying the same.

Figure 2 is a plan view partly in cross section showing the relation of the various parts of the carrier structure to a milk bottle.

Figure 3 is a plan view partly in cross section showing the manner in which the article carrier may be attached to or detached from the neck of a milk bottle.

Figure 4 is a fragmentary side elevation of the carrier and milk bottle.

Figure 5 is a fragmentary side elevation of the opposite side of the carrier to that shown in Figure 4.

In the drawings, wherein for the purpose of illustration is shown a preferred embodiment of my invention, the letter A designates a milk bottle having the improved carrier structure B detachably mounted thereon, for the purpose of facilitating in the transportation of the milk bottle A. The carrier structure B includes the resilient collar C, and the bail D.

The bottle A is preferably of the milk bottle type and includes the body 10, the constricted neck 11, and the bead 12, formed circumferentially around the upper part of the mouth of the neck 11.

The collar C is preferably formed of resilient galvanized sheet metal and approximately seven-eighths of an inch in width, to properly adapt the same for the purpose for which it is provided. The collar C is first cut in a longitudinal strip and bent substantially at the center thereof, to provide a projection 15, from which projection the ends of the collar C are curved in semi-circular fashion to provide the cooperating side semi-circular pieces 16 and 17. The semi-circular side portion 16 is provided upon its free end with an outwardly projecting end 18 substantially in longitudinal alignment with the projection 15 and diametrically opposed thereto. The free end of the semi-circular portion 17 is provided with an outwardly projecting end 19, which comprises a portion 20, connected to the section 17, and an inwardly extended end 21, bent from the forward part of the end 20 and spaced therefrom to provide a recess 23, adapted for the reception of the projecting end 18 upon the semi-circular portion 16. As hereinbefore stated, the portions 16 and 17 cooperate, and when the projection 18 rests within the recess 23, a complete circle is described by the portions 16 and 17, and adapted to receive the constricted neck 11 of the bottle A, as will be hereinafter more fully described. The projection 15 is provided with an aperture 25 therein, extending laterally therethrough; while the projection 18 is provided with an aperture 26, and the projection 19 is provided with an aperture 27, extending through both of the portions 20 and 21 thereof. When the projection 18 is disposed within the recess 23, the apertures 26 and 27 are adapted to align, for receiving the bail D.

The bail D is substantially U-shaped in formation, and comprises a leg 30 provided with an eye 31 upon an end thereof, and which eye 31 is closed, and adapted for permanent and pivotal connection to the projection 15 of the collar C and through the aperture 25 in said projection 15. A leg 31 of the bail D, is provided with an open eye 33, lying in alignment and parallel with the eye 31 of the leg 30. The eye 33 however, is provided with an opening 34 adapted for receiving the projections 18 and 19, whereby the free end 35 of the eye 33 can be inserted through the apertures 26 and 27, when the projection 18 rests within the recess 23 for the purpose of locking the semi-circular portions 16 and 17 together.

In operation, to place the collar C upon the neck 11 of the bottle A, the portions 16 and 17 are, as hereinbefore stated, sufficiently resilient to be bent adjacent the projection 15, whereby they may encircle the neck 11. After the collar C has been loosely disposed upon the neck 11, the projection 19 is grasped by the hand of the user, and the semi-circular portion 17 distorted, as shown in Figure 3 of the drawings, until the projection 18 can be disposed within the recess 23. Due to the resiliency of the portion 17, the projection 19 will normally receive the projection 18 as shown in Figure 2 of the drawings. In this position, the apertures 26 and 27 will align, and it is merely necessary to place the bail D to rest upon the side of the body 10, as shown in Figure 3 of the drawings, whereby the same can be moved to place the open portion 34 of the eye 33 over the projections 18 and 19, in order to facilitate the entrance of the free end 35 through the apertures 26 and 27; and after which the bail D can be lifted to the position as shown in Figures 1 or 4 of the drawings, whereby the collar C will be securely clamped about the neck 11 of the bottle A. In this position, the projection 18 cannot, of course, be forced, or in any way distorted from the recess 23, due to the fact that the eye 33 is now threaded, or loosely disposed through the apertures 26 and 27. Due to the fact that the bottle A such as a milk bottle, ordinarily has the bead 12 of greater circumference than the neck 11, and since the circumference of said bead 12 will be greater than the internal circumference of the collar C, the bail D can be manually grasped, whereby the collar C will slide upwardly upon the constricted neck 11 until the same abuts the bead 12, whereby the milk bottle A can be carried, without any liability whatsoever of breakage of the same by disengagement of the bottle A from the carrier structure B.

The improved carrier structure B can be used by tradesmen, such as grocers and dairymen as an accessory, with their advertisement clearly stamped upon the collar C. The carrier B will be a great aid in the carrying of a milk bottle from the dairy or grocery store to the home, by children without liability of breakage. In addition, the article carrier B can be adapted for use upon other articles, and will greatly facilitate the transportation of the same.

In order to disconnect the collar C from the constricting neck 11, the operation is exactly the reverse to that described above for the placing of the same upon the bottle A. In other words, the first operation necessary will be the placing of the bail D upon the side of the bottle A, in such manner that the eye 33 can be disengaged through the apertures in the projections 18 and 19 through the open portion 34 therein. Upon upward movement of the leg 32 of the bail D, the same can be then disconnected from the projections 18 and 19. After this operation, it will merely be necessary for a person to manually grasp the projection 19 and distort the portion 17 of the collar C as shown in Figure 3 of the drawings, whereby the projection 19 can be removed from the recess 23, and the collar C readily removed due to the split formation thereof.

It is to be understood that the form of my invention herewith shown and described is to be taken as a preferred example of the same, and that various changes in the size, shape, and arrangement of parts may be resorted to without departing from the spirit of the invention or the scope of the subjoined claims.

I claim:

1. In a carrier structure, the combination of a collar split upon one side thereof, outwardly projecting portions formed upon the free ends thereof having aligning apertures therein, said collar having an outwardly projecting portion thereon diametrically opposite said split in the collar; and a bail permanently attached to said last mentioned projection of the collar, and adapted for insertion through the apertures in the free end projection portions for maintaining the collar in closed position.

2. As an article of manufacture, a split collar formed of a single piece of sheet material having an outwardly projecting flange upon one free end thereof as defined by said split, and a second outwardly projecting flange upon the other free end of said collar as defined by said split, said second projecting flange being bent back upon itself and toward said first projection, to provide a recess for said first projection, whereby said collar can be selectively locked in closed position.

3. As an article of manufacture, a split collar having an outwardly projecting flange upon one free end thereof as defined by said split, and a second outwardly projecting flange upon the other free end of said collar as defined by said split, said second projecting flange being bent back upon itself and toward said first projection, to provide a recess for said first projection, whereby said collar can be locked in closed position, said projections having apertures therein adapted to align when said first mentioned projection is disposed within the recess as defined by said second projection, said collar having a third projecting flange intermediate said first and second mentioned projections having an aperture therein.

4. In an article carrier, the combination of a split collar having outwardly extending projections upon the free ends thereof, one of said projections being bent rearwardly upon itself to provide a recess for accommodation of said other projection; and a bail having one leg thereof permanently and pivotally attached to said collar intermediate said free ends, and a second leg adapted for engaging said projections to hold said collar in a closed position.

5. In an article carrier, the combination with a bottle having a bead upwardly of the neck thereof, of a split collar detachably connected to the neck of said bottle below said bead, said collar having outwardly extending projections upon the free ends thereof, one of said projections provided with a recessed pocket for reception of said other projection, said projections having aligning apertures therein, and a bail having one leg thereof permanently and pivotally affixed to said collar intermediate its free ends, and a second leg provided with an open loop adapted for insertion through the aligning apertures in said projections, whereby said bail may maintain the collar about the neck of said bottle in locked position, said collar adapted to rest beneath said bead, whereby said bottle can be carried.

6. As an article of manufacture, a detachable collar for containers comprising a strip of resilient material bent intermediate its ends to provide a projection having cooperating side pieces arcuated therefrom in semicircular manner to have the free ends thereof disposed adjacent each other and yet spaced apart, the free ends of said side pieces having cooperating portions thereon for relative engagement whereby said side pieces may be flexed to define an enclosed collar.

7. As an article of manufacture, a resilient collar formed of a single strip of resilient metal of substantially even width throughout, said metal bent circumferentially to provide oppositely extending ears of overlying thicknesses of the band metal, one of said ears being a rigid part of said collar and the other being split longitudinally therethrough as an entrance to said collar.

8. In a device of the class described, the combination of a collar formed of a single piece of sheet material bent intermediate its ends substantially midway thereof to provide a projecting ear having an aperture therethrough, and having side pieces arcuated in semi-circular manner away from said projection, one of said side pieces having a projecting portion radially formed upon the end thereof provided with an aperture therethrough, the other of said side pieces having a substantially U-shaped portion formed radially thereon and having apertures therethrough, said side pieces being so relatively mounted upon the projecting ear formed midway of their free ends as to normally maintain the projecting portions upon the free ends away from relative engagement, and a bail member having one end thereof permanently and pivotally attached to the apertured ear formed intermediate the collar ends, the other end of said bail having a hook arrangement thereon adapted for engagement through the apertures in the projections upon the free ends of the collar side pieces when said side piece end projection engages in the U-shaped end projection formed on the other side piece, and whereby the collar is maintained closed.

CLARENCE E. HOUGH.